United States Patent
Mitchell et al.

(10) Patent No.: US 8,255,129 B2
(45) Date of Patent: Aug. 28, 2012

(54) MULTI-STAGE NON-SEQUENTIAL DOWNSHIFT CONTROL FOR AN AUTOMATIC TRANSMISSION

(75) Inventors: Andrew L. Mitchell, Indianapolis, IN (US); Jeffrey K. Runde, Fishers, IN (US); Brett R. Caldwell, New Palestine, IN (US)

(73) Assignee: GM Global Technology Operations LLC, Detroit, MI (US)

(*) Notice: Subject to any disclaimer, the term of this patent is extended or adjusted under 35 U.S.C. 154(b) by 411 days.

(21) Appl. No.: 12/693,222

(22) Filed: Jan. 25, 2010

(65) Prior Publication Data

US 2011/0184611 A1  Jul. 28, 2011

(51) Int. Cl.
*F16H 3/44* (2006.01)
*G06F 19/00* (2006.01)

(52) U.S. Cl. ............ 701/54; 701/55; 701/61; 475/271; 477/107

(58) Field of Classification Search ............ 701/54, 701/55, 56, 62; 477/107, 144; 475/271, 475/211
See application file for complete search history.

(56) References Cited

U.S. PATENT DOCUMENTS

| | | | | |
|---|---|---|---|---|
| 6,068,576 | A * | 5/2000 | Tsutsui et al. | 477/144 |
| 6,577,939 | B1 * | 6/2003 | Keyse et al. | 701/55 |
| 2003/0203790 | A1 * | 10/2003 | Matsubara et al. | 477/107 |

* cited by examiner

*Primary Examiner* — Tan Q Nguyen

(57) ABSTRACT

An improved downshift control for an automatic transmission optimized for sequential shifting achieves a non-sequential fifth gear to third gear downshift by reducing the main pressure of the transmission hydraulic control system, allowing a offgoing clutch to slip, disengaging the offgoing clutch, using torque reduction to control engine speed, engaging the oncoming clutch, increasing the main pressure of the transmission hydraulic control system and using torque reduction to synchronize the transmission input speed with the third gear transmission output speed.

16 Claims, 3 Drawing Sheets

| | TORQUE TRANSMITTING MECHANISM | | | | |
|---|---|---|---|---|---|
| RANGE | C1 | C2 | B1 | B2 | B3 |
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

MULTI-STAGE NON-SEQUENTIAL DOWNSHIFT CONTROL FOR AN AUTOMATIC TRANSMISSION

FIELD

The present disclosure relates to control of automatic transmissions, more specifically the control of a non-sequential downshift of an automatic transmission.

BACKGROUND

The statements in this section merely provide background information related to the present disclosure and may or may not constitute prior art.

In general, an automatic shifting power transmission includes a number of gear elements and torque-transmitting mechanisms that are selectively controlled to establish one of several forward speed ratios between the transmission input and output shafts. The input shaft is commonly coupled to an engine of the vehicle through a fluid coupling such as a torque converter, and the output shaft is coupled to the vehicle drive wheels through a differential gear set. Shifting from a currently established speed ratio to a numerically adjacent speed ratio involves, in most cases, disengaging a torque-transmitting mechanism (off-going torque-transmitting mechanism) associated with the current speed ratio and engaging a torque-transmitting mechanism (on-coming torque-transmitting mechanism) associated with the new speed ratio.

Since most shifts involve numerically adjacent speed ratios (i.e., sequential shifting), the fluid control hardware is designed to minimize the number of modulated pressure control valves, as disclosed for example, in the U.S. Pat. No. 5,601,506 to Long et al., issued on Feb. 11, 1997, and assigned to the assignee of the present invention. In Long et al., a set of relatively inexpensive on/off relay valves selectively couple the various transmission torque-transmitting mechanisms to two modulated valves, such that a certain combination of torque-transmitting mechanisms can only be coupled to a given modulated valve, and for any shift to a numerically adjacent speed ratio, one of the modulated valves is coupled to the on-coming torque-transmitting mechanism, and the other modulated valve is coupled to the off-going torque-transmitting mechanism. While such an arrangement can significantly simplify the control hardware and reduce manufacturing costs, it essentially rules out non-sequential downshifting. Thus, if the transmission is operating in third gear, for example, and the engine load abruptly increases to a level for which first gear would be appropriate, the controller must successively perform sequential shifts from third-to-second, and from second-to-first, instead of skip-shifting from third-to-first. Performing multiple sequential shifts takes the same amount of time as if the shifts are made separately Accordingly, there is room in the art for an apparatus and method for performing timely non-sequential downshifts in a transmission where the control valve configuration is optimized for sequential shifting.

SUMMARY

The present invention provides an automobile powertrain including an engine, a torque converter coupled to the engine, a drive shaft, an automatic transmission having an input shaft drivingly connected to the torque converter, an output shaft drivingly connected to the drive shaft, a plurality of gear ratios, a plurality of torque-transmitting mechanisms and a hydraulic control system, an engine control unit electrically connected to the engine and a transmission control unit electrically connected to the hydraulic control system, wherein the transmission control unit has control logic operable to downshift the transmission from a fifth of the plurality of gear ratios to a third of the plurality of gear ratios by controlling engagement of the plurality of torque-transmitting mechanisms. The control logic includes a first control logic for demanding a downshift from the fifth of the plurality of gear ratios to the third of the plurality of gear ratios. A second control logic reduces a main pressure of the hydraulic control system to a minimum pressure in order to allow a first of the plurality of torque-transmitting mechanisms to slip. A third control logic retards a torque output of the engine when the first of the plurality of torque-transmitting mechanisms begins to slip. A fourth control logic calculates a value of the torque output of the engine required to accelerate the input shaft to achieve a third gear synchronous speed within a specified time. A fifth control logic disconnects the main pressure of the hydraulic control system from the first of the plurality of torque-transmitting mechanisms and connecting the main pressure to a second of the plurality of torque-transmitting mechanisms thereby exhausting a remaining hydraulic pressure from the first of the plurality of torque-transmitting mechanisms and partially pressurizing the second of the plurality of torque-transmitting mechanisms. A sixth control logic controls the torque output of the engine to the calculated value of the torque output required to accelerate the input shaft of the transmission to the third gear synchronous speed. A seventh control logic modulates the main pressure of the hydraulic control system to engage the second of the plurality of torque-transmitting mechanisms and establish the third of the plurality of gear ratios between the input shaft and the output shaft In another example of the present invention, an eighth control logic releases control of the torque output of the engine.

In yet another example of the present invention, a ninth control logic returns the main pressure of the hydraulic control system to a nominal operating pressure.

In yet another example of the present invention, the plurality of gears of the transmission are a plurality of planetary gear sets.

In yet another example of the present invention, the first and second of the plurality torque-transmitting mechanisms are a first clutch and a second clutch.

In yet another example of the present invention, the fifth of the plurality of gear ratios is achieved when the first and a third of the torque-transmitting mechanisms are engaged and the third of the plurality of gear ratios is achieved when the second and the third of the torque-transmitting mechanisms are engaged.

In yet another example of the present invention, the hydraulic control system includes a relay valve operable to connect the main pressure of the hydraulic control system with at least one of the first and second of the plurality of torque-transmitting mechanisms.

In yet another example of the present invention, a third of the plurality of torque-transmitting mechanisms has a higher torque capacity than the first of the plurality of torque-transmitting mechanisms.

In yet another example of the present invention, the value of engine output torque required to accelerate the input shaft to achieve the third gear synchronous speed within the specified time is calculated by:

$$I_{eng}*[(N_{3syn}-\text{TIS})/T_{des}]$$

where $I_{eng}$ is an estimate of engine inertia, $N_{3syn}$ is the third gear synchronous speed, TIS is the speed of the input shaft when the first torque-transmitting mechanism begins to slip, and $T_{des}$ is the specified time.

Further objects, aspects and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figures 1, 2:
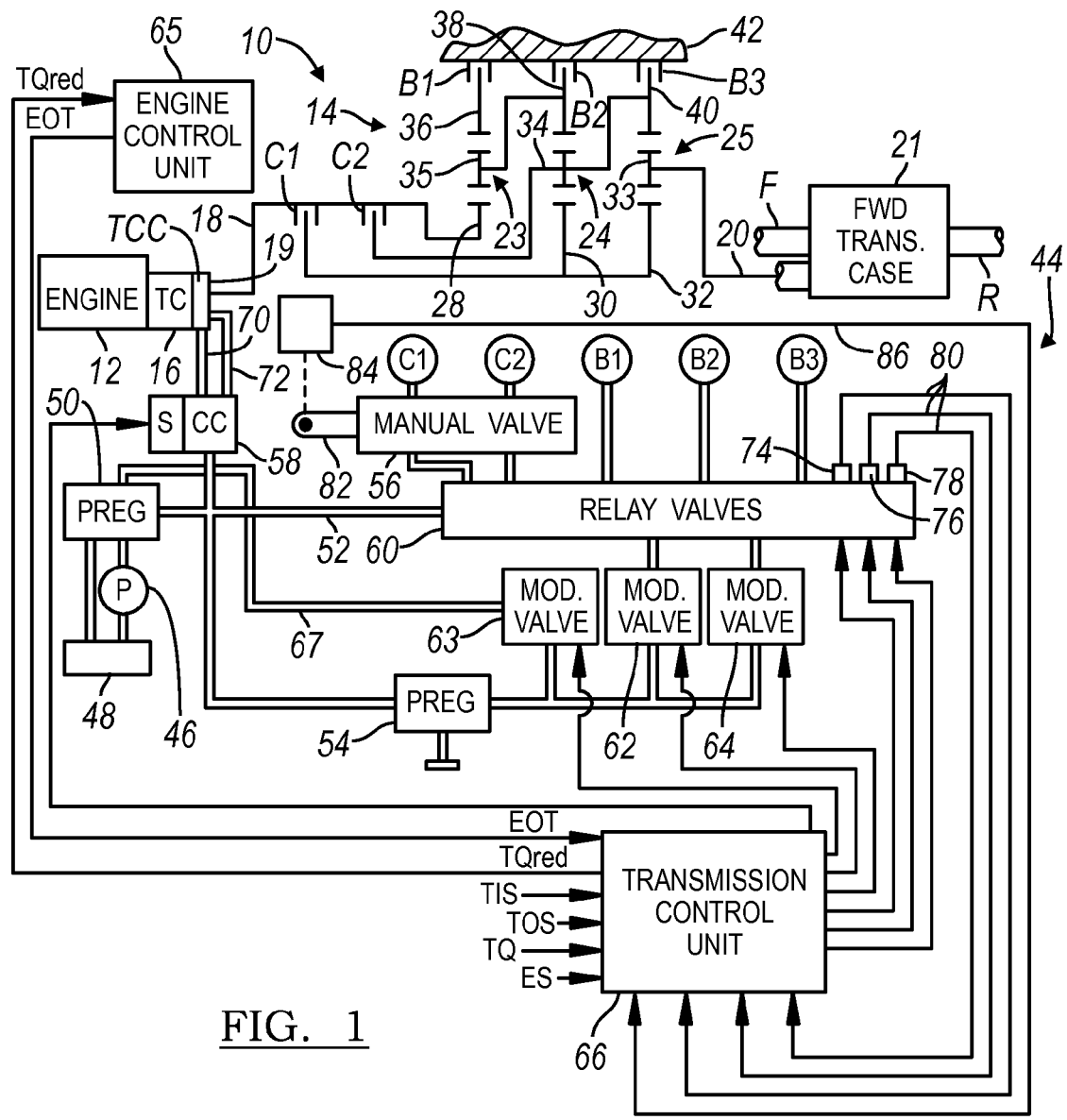
FIG. 1 is a schematic of an automatic transmission and microprocessor-based engine and transmission control units for carrying out the control of this invention.
FIG. 2 is a truth table presenting the state of engagement of the various torque-transmitting elements in each of the available forward and reverse speeds or gear ratios of the transmission illustrated in FIG. 1.

Referring to FIG. 1, the reference numeral 10 generally designates an exemplary vehicle powertrain including an engine 12, a transmission 14, and a torque converter 16 providing a fluid coupling between engine 12 and a transmission input shaft 18. A torque converter clutch 19 is selectively engaged under certain conditions to provide a mechanical coupling between engine 12 and transmission input shaft 18. A transmission output shaft 20 is coupled to the driving wheels of the vehicle in one of several conventional ways. For example, the driving wheels may be coupled to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

In an example of the present invention, the transmission 14 further includes five of torque-transmitting mechanisms C1, C2, B1, B2, B3, three planetary gear sets 23, 24, 25, and a transmission housing 42. Each of the planetary gear sets 23, 24, 25 includes a sun gear, a carrier member and a ring gear. The gears and members of the planetary gear sets 23, 24, 25 are connected to each other, the input shaft 18 or output shaft 20 using interconnecting members or shafts. More specifically, the input shaft 18 is connected to the sun gear 28 of the first planetary gear set 23. The output shaft 20 is connected to the carrier member 33 of the third planetary gear set 25. The carrier member 35 of the first planetary gear set 23 is connected to the ring gear 38 of the second planetary gear set 24. The carrier member 34 of the second planetary gear set 24 is connected to the ring gear 40 of the third planetary gear set 25. The sun gear 30 of the second planetary gear set 24 is connected to the sun gear 32 of the third planetary gear set 25.

The five torque-transmitting mechanisms C1, C2, B1, B2, B3 of the transmission 14 selectively connect at least one of the gears or members of the planetary gear sets 23, 24, 25 with a gear or member of another planetary gear set 23, 24, 25, the transmission housing 42, the input shaft 18 or the output shaft 20. More specifically, two of the five torque-transmitting mechanisms are clutches C1, C2 and three of the five torque-transmitting mechanisms are brakes B1, B2, B3. The first clutch C1 selectively connects the input shaft 18 to the sun gear 30 of the second planetary gear set 24 and the sun gear 32 of the third planetary gear set 25. The second clutch C2 selectively connects the input shaft 18 to the carrier member 34 of the second planetary gear set 24 and the ring gear 40 of the third planetary gear set 25. The first brake B1 selectively connects the ring gear 36 of the first planetary gear set 23 with the transmission housing 42. The second brake B2 selectively connects the carrier member 35 of the first planetary gear set 23 and the ring gear 38 of the second planetary gear set 24 with the transmission housing 42. The third brake B3 selectively connects the carrier member 34 of the second planetary gear set 24 and the ring gear 40 of the third planetary gear set 25 with the transmission housing 42.

As diagrammed in FIG. 2, the state of the torque-transmitting mechanisms C1, C2, B1, B2, B3 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging the first clutch C1 and the third brake B3. Shifting from one speed forward speed ratio to a numerically adjacent speed ratio is achieved by disengaging one torque-transmitting mechanism (referred to as the off-going torque-transmitting mechanism) while engaging another torque-transmitting mechanism (referred to as the on-coming torque-transmitting mechanism). For example, the transmission 14 is shifted from first gear to second gear by disengaging the third brake B3 and engaging the second brake B2.

The torque converter clutch 19 and the torque-transmitting mechanisms C1, C2, B1, B2, B3 are controlled by an electrohydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the operator of the vehicle and a number of solenoid operated fluid control valves 58, 60, 62, 63, 64. The fluid control valve 63 in turn provides a fluid pressure signal to the pressure regulator 50 through line 67.

The electronic portion of the control is primarily embodied in the engine control unit (ECU) 65 and the transmission control unit (TCU) 66, illustrated in FIG. 1 as two separate modules. Both control units 65, 66 are microprocessor-based, and may be conventional in architecture. The ECU 65 controls the operation of engine functions such as fuel, spark timing, and so on depending on the control variables afforded by engine 12, and the TCU 66 controls the solenoid operated fluid control valves 58, 60, 62, 63, 64 based on a number of inputs to achieve a desired transmission speed ratio. The inputs to TCU 66 include signals representing the transmission input speed TIS, engine speed ES, an operator torque request TQ, and the transmission output speed TOS. Sensors for developing such signals may be conventional in nature, and have been omitted for simplicity. Additionally, ECU 65 supplies an engine output torque signal EOT to TCU 66, and TCU 66 supplies a torque reduction command signal TQred to ECU 65.

The control lever 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the vehicle operator. Finally, the fluid control valves 60 are provided with pressure switches 74, 76, 78 for supplying diagnostic signals to TCU 66 on lines 80 based on the respective relay valve positions. The TCU 66, in turn, monitors the various diagnostic signals for the purpose of electrically verifying proper operation of the controlled elements.

The solenoid operated fluid control valves 60, 62, 63, 64 are generally characterized as being either of the on/off or modulated type. In general, modulated valves comprise a conventional pressure regulator valve biased by a variable pilot pressure that is developed by current controlled force motor, and a desired pressure is achieved by controlling the force motor current to a corresponding value. In the case of shifting, for example, TCU 66 determines pressure commands for smoothly engaging the on-coming torque-transmitting mechanism while smoothly disengaging the off-going torque-transmitting mechanism, develops corresponding force motor current commands for the respective modulated valves, and then supplies current to the force motors in accordance with the respective current commands. The converter clutch 19 is also controlled by a modulated valve 58, which controls the fluid pressure in lines 70 and 72 for selectively engaging and disengaging the converter clutch 19.

Since modulated valves are significantly more expensive to manufacture and control than simple on/off valves, and since the most commonly performed shifts (i.e., sequential shifts to numerically adjacent speed ratios) involve only one on-coming torque-transmitting mechanism and one off-going torque-transmitting mechanism, the control system 44 can be designed to minimize the number of modulated valves. For example, the control system 44 includes just three modulated shift control valves 62, 63, 64 combined with a set of on/off (relay) valves 60. The relay valves 60 couple the modulated valves 62, 64 to the on-coming or off-going torque-transmitting mechanisms, and couple the other torque-transmitting mechanisms to either full line pressure or exhaust. Additionally, the design of the relay valves 60 can be simplified for sequential shifting if the modulated shift control valves 62, 64 are dedicated to non-sequential torque-transmitting mechanisms. For example, modulated valve 62 may be dedicated to clutches C1, C2 and second brake B2, and modulated valve 64 may be dedicated to first and third brake B1, B3. Referring to the table of FIG. 2, the relay valves 60 enable a sequential downshift from fifth gear to fourth gear, for example, by coupling modulated valve 62 to on-coming clutch C1 and coupling modulated valve 64 to off-going brake B1. Similarly, the relay valves 60 enable a sequential downshift from fourth gear to third gear by coupling modulated valve 62 to off-going clutch C2 and coupling modulated valve 64 to on-coming brake B1.

The TCU 66 generally includes an electronic control device having a preprogrammed digital computer or processor, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the electronic memory storage and engine control unit table by the processor. The TCU 66 receives input data from TIS, TOS, TQ, ES, and pressure switches 74, 76, 78, performs the control logic and sends command signals to the ECU 65, the shift control valves 62, 63, 64 and the relay valves 60. The shift control valves 62, 63, 64 and relay valves 60 receive command signals from the TCU 66 and convert the command signals to hydraulic signals to control the actuation of the torque-transmitting mechanisms C1, C2, B1, B2, B3. These control signals include, for example, on/off hydraulic signals and a pressure regulation signal.

A control logic may be implemented in software program code that is executable by the processor of the TCU 66 for executing a non-sequential downshift from the fifth gear to the third gear ratio. For example, such a control logic is used when the transmission is running in fifth gear, by having the second clutch C2 and the first brake B1 engaged. The control logic includes a first control logic for demanding a transmission downshift from fifth gear to third gear. A second control logic signals shift control valve 63 to provide a hydraulic signal to the pressure regulation valve 50 to reduce the main system pressure $P_{main}$ to a minimum pressure $P_{min}$ which allows the second clutch C2 to slip. The first brake B1 does not slip due to having a higher torque capacity than second clutch C2 and can remain engaged even as the main pressure $P_{main}$ is lowered to $P_{min}$. A third control logic signals the ECU 65 to retard engine output torque EOT by overriding ECU 65 control parameters and manipulating engine spark timing, fuel and throttle position. In retarding engine output torque EOT, the engine is prevented from overshooting the transmission input speed TIS beyond the third gear synchronous speed $N_{3syn}$. A fourth control logic calculates the engine output torque $EOT_{des}$ required to achieve an engine speed equal to the transmission input shaft speed TIS corresponding to the third gear synchronous speed $N_{3syn}$. A fifth control logic allows the second clutch C2 to exhaust hydraulic pressure. A sixth control logic signals the relay valves 60 to disengage the second clutch C2 and engage the first clutch C1. A seventh control logic signals the ECU 65 to run the engine at the engine output torque $EOT_{des}$ required to achieve the third gear synchronous speed $N_{3syn}$ in a time $T_{des}$. The time $T_{des}$ is a calibrated value that is selected to achieve various operational results. An eighth control logic signals the shift control valve 63 to provide a hydraulic signal to the pressure regulation valve 50 to modulate the main pressure $P_{main}$ to fill and trim the first clutch C1. The ninth control logic signals the ECU 65 to cease control of the engine output torque EOT and return control to the throttle THR. The tenth control logic signals the shift control valve 63 to provide a hydraulic signal to the pressure regulation valve 50 to return the main pressure $P_{main}$ to nominal operating pressure $P_{nom}$.

Figure 3:
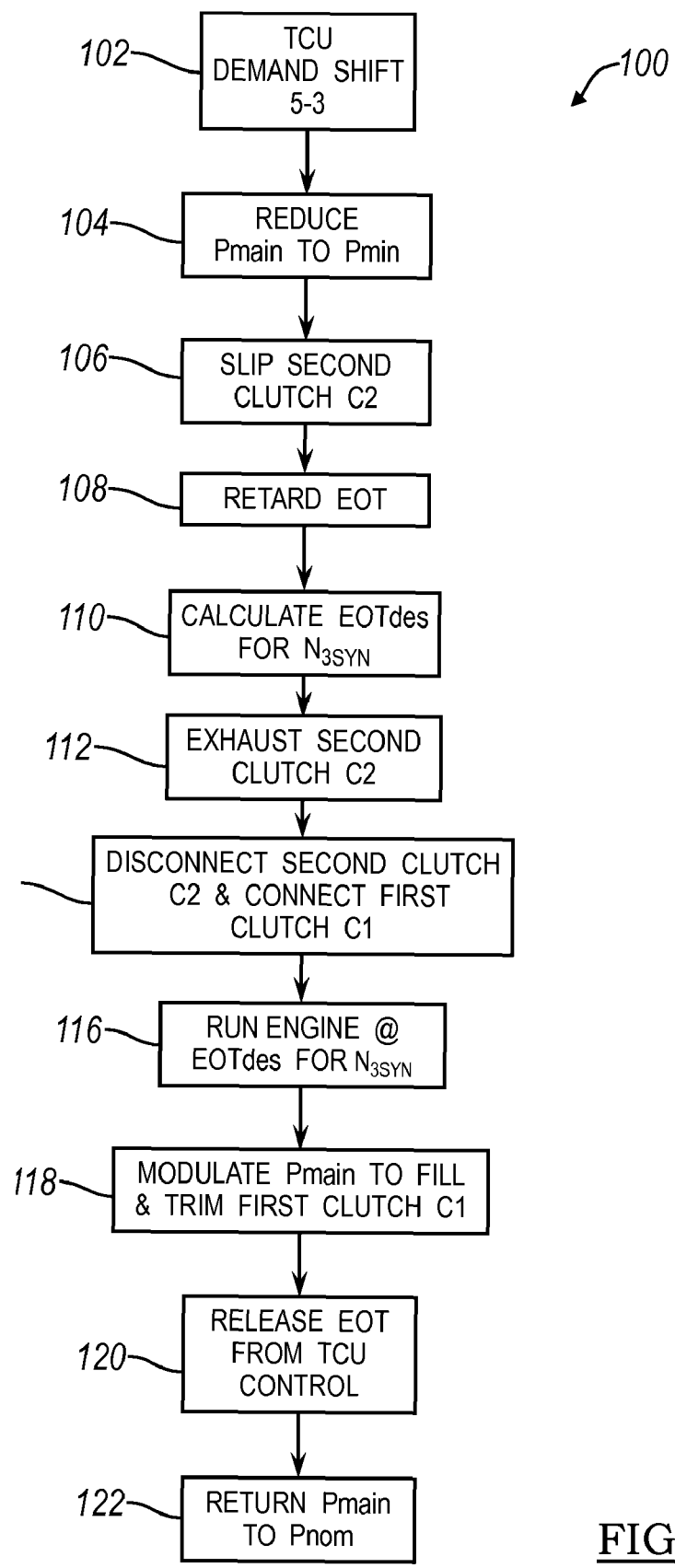
FIG. 3 is a flowchart depicting a method of performing a downshift from fifth to third gear carried out by the engine and transmission control units of FIG. 1.

Referring now to FIG. 3, a flowchart of a method 100 for controlling a transmission executing a non-sequential downshift from fifth gear to third gear, in accordance with an example of the present invention will now be described. The steps of the method 100 correspond to the control logic described above employed by the TCU 66. The method begins at block 102 by demanding a transmission downshift from fifth gear to third gear. In block 104, the TCU 66 signals shift control valve 63 to provide a hydraulic signal to the pressure regulation valve 50 to reduce the main system pressure $P_{main}$ to $P_{min}$ which allows the second clutch C2 to slip at block 106. In block 108, the TCU 66 signals the ECU 65 to retard engine output torque $TQ_{red}$ to prevent the transmission input speed TIS from overshooting the third gear synchronous speed $N_{3syn}$. In block 110, the TCU 66 calculates the engine output torque $EOT_{des}$ required to achieve the input shaft speed TIS corresponding to the third gear synchronous speed $N_{3syn}$. In block 112, the second clutch C2 exhausts the remaining hydraulic pressure. In block 114, the TCU 66 signals the relay valves 60 to disengage the second clutch C2 and engage the first clutch C1. In block 116, the TCU 66 signals the ECU 65 to run the engine to the engine output torque $EOT_{des}$ which is required to achieve the third gear synchronous speed $N_{3syn}$ in a time $T_{des}$. In block 118, the TCU 66 signals the shift control valve 63 to provide a hydraulic signal to the pressure regulation valve 50 to modulate the main pressure $P_{main}$ to fill and trim the first clutch C1. In block 120, the TCU 66 signals the ECU 65 to cease control of the engine output torque EOT to allow control of engine output torque EOT to return to operator control of the throttle setting THR. In block 122, the TCU 66 signals the shift control valve 63 to provide a hydraulic signal to the pressure regulation valve 50 to set the main system pressure $P_{main}$ to nominal operating pressure $P_{nom}$.

Figure 4:
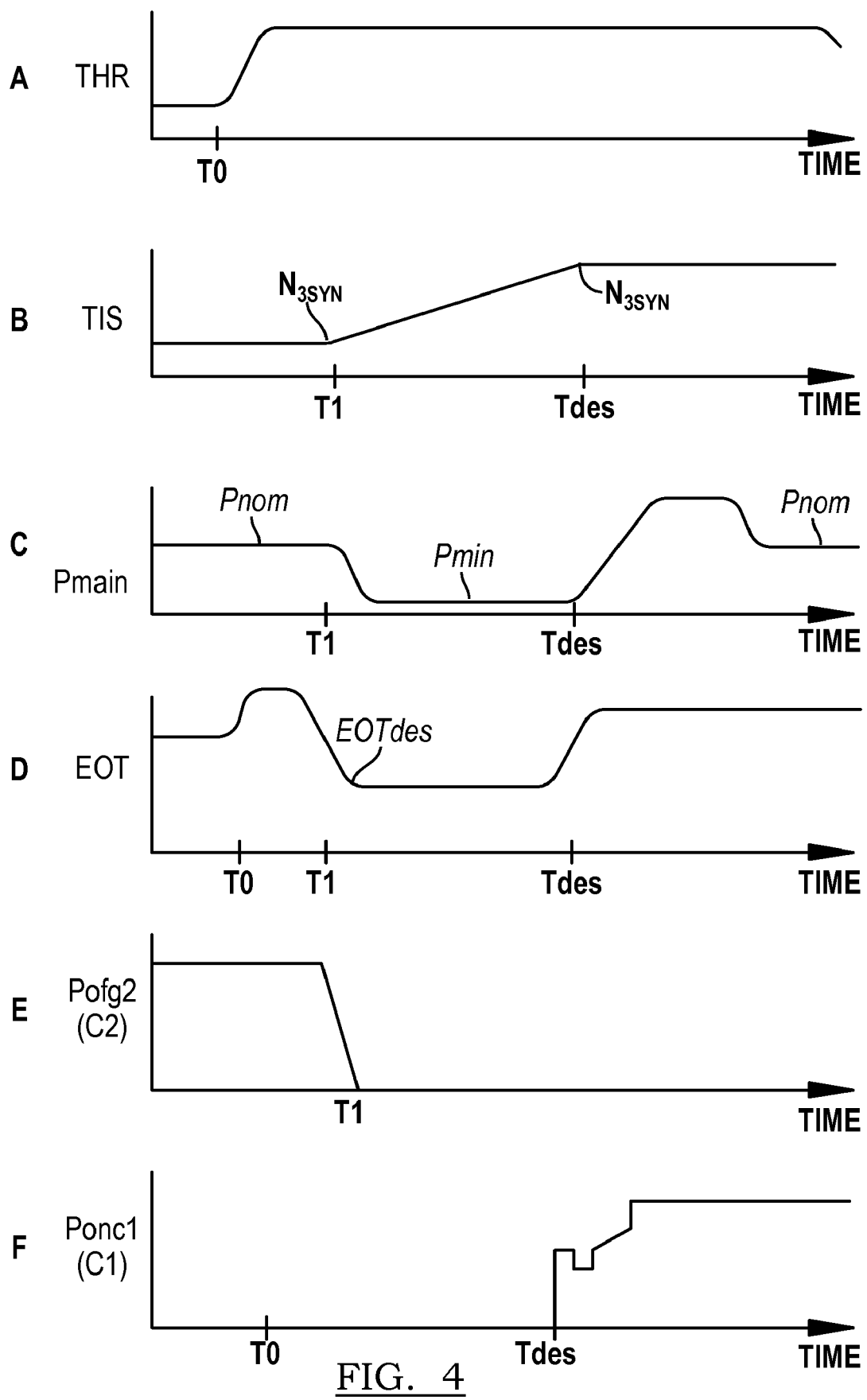
FIG. 4 graphically depicts a single non-sequential transmission downshift from fifth gear to third gear as carried out by the engine and transmission control units of FIG. 1.

The above-described fifth gear to third gear non-sequential downshift is graphically depicted in FIG. 4, where Graph A depicts the engine throttle setting THR, Graph B depicts the transmission input speed TIS, Graph C depicts the control system 44 main pressure $P_{main}$, Graph D depicts the engine output torque EOT, Graph E depicts the fluid pressure $P_{ofg2}$ supplied to off-going second clutch C2, and Graph F depicts the fluid pressure $P_{onc1}$ supplied to on-coming first clutch C1. In Graph A, the throttle setting THR is shown to abruptly increase at time T0, and produces a corresponding increase in engine output torque EOT, shown in Graph D. The increased throttle setting THR also causes the TCU 66 to command a non-sequential fifth gear to third gear downshift, which is initiated at time T1 by dropping the main pressure $P_{main}$ to a first calibrated value $P_{min}$, as shown in Graph C. The third brake B3, having a larger torque capacity than the second clutch C2, remains engaged while the main pressure $P_{main}$ is decreased and the second clutch C2 begins to slip. This allows the second clutch C2 to disengage without dedicating an additional valve to this operation. However, with only the first brake B1 engaged, the transmission is in neutral and subject to allowing the engine to uncontrollably accelerate. The uncontrolled engine acceleration would cause the transmission input speed TIS to accelerate beyond the speed required for third gear synchronous speed $N_{3syn}$. To prevent the engine acceleration, the TCU 66 sends a $TQ_{red}$ signal to the ECU 65 to retard engine output torque EOT as shown in Graph D at T1. Next, the TCU 66 calculates the engine output torque $EOT_{des}$ required to achieve the transmission input speed TIS that is synchronous with a third gear output speed $N_{3syn}$. Accordingly, the torque reduction command $TQ_{red}$ is adjusted to drop the engine output torque EOT to a value $EOT_{des}$ that will allow the input speed TIS to reach the third gear synchronization speed $N_{3syn}$ at desired time $T_{des}$. As explained below, the torque value $EOT_{des}$ can be computed based on the required change in input speed TIS, the time interval $T_{des}$ and an estimate of the engine inertia $I_E$, and an adaptive term $TQ_{ad}$ which is used to trim the control over the course of one or more shifts to help ensure that TIS actually reaches $N_{3syn}$ at time $T_{des}$. The desired time $T_{des}$ must be at least as long as the time required to re-configure relay valve 60 to disengage the second clutch C2 and engage the first clutch C1. In the illustration of FIG. 4, once the relay valve 60 is reconfigured, the system main pressure $P_{main}$ is increased to fill and trim the first clutch C1. At the same time, the transmission input speed TIS is reaching the third gear synchronous speed $N_{3syn}$. When TIS reaches $N_{3syn}$ at time $T_{des}$, $TQ_{red}$ is adjusted to ramp EOT toward a value corresponding to the engine throttle setting THR, which is reached at time T, after on-coming first clutch C1 is fully engaged.

As indicated above, the torque value EOTdes can be computed at time T3 according to the expression:

$$EOT_{des}=I_E*[(N_{3syn}-TIS)/T_{des}]+TQ_{ad} \qquad (1)$$

where $I_E$ is an estimate of the engine inertia, $(N_{3syn}-TIS)$ is the required change in input speed TIS, and $TQ_{ad}$ is an adaptive term is used to trim the control over the course of one or more nonsequential fifth gear to third gear downshifts to help ensure that TIS actually reaches $N_{3syn}$ at time $T_{des}$. In general, the adaptive term $TQ_{ad}$ can be updated upon completion of each such nonsequential fifth gear to third gear downshift. An example of the calculation of $TQ_{ad}$ is found in commonly assigned U.S. Pat. No. 6,656,087, hereby incorporated by reference as if fully disclosed herein.

The control of the present invention provides a transmission and methodology for performing a non-sequential downshift from fifth gear to third gear where the control valve configuration is optimized for sequential shifting. By using an additional control valve to modulate the main pressure, the system quickly and smoothly disengages the offgoing torque-transmitting mechanism and engages the oncoming torque-transmitting mechanisms. Further use of torque reduction strategy to control the engine output torque initially prevents the engine from racing and then synchronizes the transmission input speed with the third gear synchronization speed provides for additional improvements in shift speed and smoothness.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. An automobile powertrain comprising:
    an engine;
    a torque converter coupled to the engine;
    a drive shaft;
    an automatic transmission having an input shaft drivingly connected to the torque converter, an output shaft drivingly connected to the drive shaft, a plurality of gear ratios, a plurality of torque-transmitting mechanisms and a hydraulic control system;
    an engine control unit electrically connected to the engine; and
    a transmission control unit electrically connected to the hydraulic control system, wherein the transmission control unit has control logic operable to downshift the transmission from a fifth of the plurality of gear ratios to a third of the plurality of gear ratios by controlling engagement of the plurality of torque-transmitting mechanisms, the control logic including:
        a first control logic for demanding a downshift from the fifth of the plurality of gear ratios to the third of the plurality of gear ratios;
        a second control logic for reducing a main pressure of the hydraulic control system to a minimum pressure in order to allow a first of the plurality of torque-transmitting mechanisms to slip;
        a third control logic for retarding a torque output of the engine when the first of the plurality of torque-transmitting mechanisms begins to slip;
        a fourth control logic for calculating a value of the torque output of the engine required to accelerate the input shaft to achieve a third gear synchronous speed within a specified time;
        a fifth control logic for disconnecting the main pressure of the hydraulic control system from the first of the plurality of torque-transmitting mechanisms and connecting the main pressure to a second of the plurality of torque-transmitting mechanisms thereby exhausting a remaining hydraulic pressure from the first of the plurality of torque-transmitting mechanisms and partially pressurizing the second of the plurality of torque-transmitting mechanisms;

a sixth control logic for controlling the torque output of the engine to the calculated value of the torque output required to accelerate the input shaft of the transmission to the third gear synchronous speed; and a seventh control logic for modulating the main pressure of the hydraulic control system to engage the second of the plurality of torque-transmitting mechanisms and establish the third of the plurality of gear ratios between the input shaft and the output shaft.

2. The automobile powertrain of claim 1 wherein the control logic further includes an eighth control logic for releasing control of the torque output of the engine.

3. The automobile powertrain of claim 2 wherein the control logic further includes a ninth control logic for returning the main pressure of the hydraulic control system to a nominal operating pressure.

4. The automobile powertrain of claim 1 wherein the plurality of gears of the transmission are a plurality of planetary gear sets.

5. The automobile powertrain of claim 1 wherein the first and second of the plurality torque-transmitting mechanisms are a first clutch and a second clutch.

6. The automobile powertrain of claim 1 wherein the fifth of the plurality of gear ratios is achieved when the first and a third of the torque-transmitting mechanisms are engaged and the third of the plurality of gear ratios is achieved when the second and the third of the torque-transmitting mechanisms are engaged.

7. The automobile powertrain of claim 1 wherein the hydraulic control system includes a relay valve operable to connect the main pressure of the hydraulic control system with at least one of the first and second of the plurality of torque-transmitting mechanisms.

8. The automobile powertrain of claim 1 wherein a third of the plurality of torque-transmitting mechanisms has a higher torque capacity than the first of the plurality of torque-transmitting mechanisms.

9. The automobile powertrain of claim 1 wherein the value of engine output torque required to accelerate the input shaft to achieve the third gear synchronous speed within the specified time is calculated by:

$$I_{eng}*[(N_{3syn}-TIS)/T_{des}]$$

where $I_{eng}$ is an estimate of engine inertia, $N_{3syn}$ is the third gear synchronous speed, TIS is the speed of the input shaft when the first torque-transmitting mechanism begins to slip, and $T_{des}$ is the specified time.

10. A method of controlling an automobile powertrain having an engine, a transmission operable to achieve a plurality of gear ratios, an engine control unit and a transmission control unit, and wherein the transmission includes an input shaft, an output shaft, a plurality of gear ratios, a plurality of torque-transmitting mechanisms and a hydraulic control system, the method comprising:

demanding a downshift from a fifth of the plurality of gear ratios to a third of the plurality of gear ratios;

reducing a main pressure signal of the hydraulic control system to a minimum pressure to allow a first of the plurality of torque-transmitting mechanisms to slip;

reducing a torque output of the engine when the first of the plurality of torque-transmitting mechanisms begins to slip;

calculating a value of the torque output of the engine required to accelerate the input shaft to achieve a third gear synchronous speed within a specified time;

disconnecting the main pressure of the hydraulic control system from the first of the plurality of torque-transmitting mechanisms and connecting the main pressure to a second of the plurality of torque-transmitting mechanisms thereby exhausting a remaining hydraulic pressure from the first of the plurality of torque-transmitting mechanisms and partially pressurizing the second of the plurality of torque-transmitting mechanisms;

controlling the torque output of the engine to the calculated value of the torque output required to accelerate the input shaft of the transmission to the third gear synchronous speed; and modulating the main pressure of the hydraulic control system to engage the second of the plurality of torque-transmitting mechanisms to establish the third of the plurality of gear ratios between the input shaft and the output shaft.

11. The method of claim 10 further comprising releasing control of the torque output of the engine.

12. The method of claim 10 further comprising returning the main pressure of the hydraulic control system to a nominal operating pressure.

13. The method of claim 10 wherein the value of engine output torque required to accelerate the input shaft to achieve the third gear synchronous speed within the specified time is calculated by:

$$I_{eng}*[(N_{3syn}-TIS)/T_{des}]$$

where $I_{eng}$ is an estimate of engine inertia, $N_{3syn}$ is the third gear synchronous speed, TIS is the speed of the input shaft when the second torque-transmitting mechanism begins to slip, and $T_{des}$ is the specified time.

14. The method of claim 13 wherein the speed of the input shaft when the first torque-transmitting mechanism begins to slip is equal to a fifth gear synchronous speed.

15. The method of claim 13 wherein the specified time is a calibrated value.

16. The method of claim 13 wherein the third gear synchronous speed is equal to the speed of the output shaft when the transmission is in third gear.

* * * * *